United States Patent Office 3,553,285
Patented Jan. 5, 1971

3,553,285
VINYLCOPOLYMERS WITH POLYAMIDE GRAFT
Hugo Vernaleken, Georg Malamet, Ludwig Bottenbruch, and Heinrich Krimm, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Dec. 20, 1968, Ser. No. 785,754
Claims priority, application Germany, Jan. 4, 1968, 1,720,773
Int. Cl. C08g 41/04
U.S. Cl. 260—857
9 Claims

ABSTRACT OF THE DISCLOSURE

Vinylcopolymers with a polyamide graft prepared by polycondensation of N-carbaryloxy-aminocarboxylic acids in the presence of copolymers of vinyl-monomers which contain masked isocyanate groups with evolution of the masking agent and carbon dioxide.

---

The invention relates to vinylcopolymers on which polyamides are grafted and to a process for their production by polycondensation of N-carbaryloxy-aminocarboxylic acids in the presence of vinylcopolymers which contain masked isocyanate groups.

The preparation of vinyl copolymers on which polyamides are grafted is already known. Thus, for example, the grafting of polyamide chains on copolymers of vinyl monomers which contain carboxyl groups, by condensation of these copolymers with aminocarboxylic acids or their lactams has been described.

Further, a process for the preparation of high molecular weight polyamides by reacting N-carbaryloxy-aminocarboxylic acids with each other has been proposed.

It is an object of this invention to provide new vinylcopolymers with a polyamide graft, having the recurring structural unit

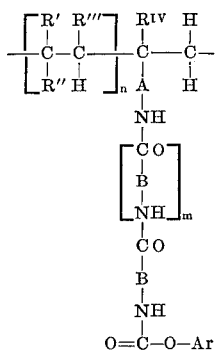

wherein R′ represents hydrogen, chlorine, methyl, phenyl, methyl-substituted phenyl, acetoxy nitrile, the radical ROOC (in which R is $C_1$ to $C_4$ alkyl) or the radical

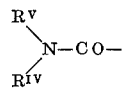

(in which $R^V$ and $R^{VI}$ are hydrogen, methyl or ethyl), R″ represents hydrogen, chlorine or methyl,
R‴ represents hydrogen or methyl,
$R^{IV}$ represents hydrogen or methyl,
A represents a single bond,

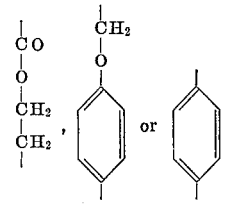

B represents a $C_3$ to $C_{10}$ alkylene radical, a phenylene radical, a chloro-, methyl- or methoxy-substituted phenylene radical or a phenyl alkyl radical or combinations thereof within one side chain, Ar represents a phenyl or substituted phenyl radical, and $n$ and $m$ are whole numbers, the ratio by weight of the units

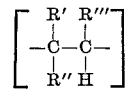

to the units

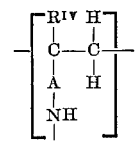

in the graft backbone being about 999:1 to about 9:1, and the ratio by weight of the graft backbone to the polyamides grafted thereon being about 10:1 to 1:50.

The molecular weight of the side chains is preferably from 1000 to 50,000.

It is another object of this invention to provide a process for the production of vinylcopolymers with a polyamide graft which comprises polycondensing N-carbaryloxy-aminocarboxylic acids or mixtures thereof in the presence of vinylcopolymers of vinyl monomers which contain masked isocyanate groups, said polycondensing being carried out at temperatures of between about 150 and about 300° C.

The advantages of this process lie in the high velocity of the polyamide formation reaction at relatively low temperatures. Damage by heat of the vinyl copolymers which are generally unstable when exposed to elevated temperatures over prolonged periods is thereby prevented. Another important advantage lies in the nature of the polyamide formation. Grafting of the N-carbaryloxy-amino carboxylic acids takes place specifically on the masked isocyanate groups contained in the copolymer. Thus, in contrast to the method of grafting by polycondensation with free amino carboxylic acids, their esters, amides, or lactams, practically any vinyl copolymer can be grafted, provided it contains masked isocyanate groups, since unwanted side reactions with functional groups of the vinyl polymers, such as ester, amide or nitrile groups, do not occur.

In addition to these advantages concerning the almost unlimited possibility of using any vinyl copolymers, the process according to the invention affords the possibility of varying the structure of the grafted polyamides to any extent desired by using different N-carbaryloxy-amino-carboxylic acids, for example by co-condensation of different aliphatic and/or aromatic N-carbaryloxyamino carboxylic acids.

Since the condensation of the N-carbaryloxy-aminocarboxylic acids proceeds practically quantitatively, products which contain very small amounts of extractable material are obtained.

The possible range of application of the process according to the invention is further increased by the possibility of also carrying out the polyamide grafting in solvents.

The following are given as examples of vinyl monomers which can be used for the preparation of the vinyl copolymers used for grafting: ethylene, propylene, butadiene, vinyl chloride, styrene, styrenes which are methylated in the nucleus, α-methylstyrene, vinyl acetate, ester, amides and nitriles of acrylic acid and of methacrylic acid.

These may also be used in admixture. Styrene and styrenes which are methylated in the nucleus, α-methyl styrene, acrylic and methacrylic acid esters and acrylonitrile are used for preference.

The following polymerisable isocyanates, which must be used in the form of masked isocyanates, are given as examples of suitable isocyanates for copolymerisation with these vinyl monomers: vinyl isocyanate, allyl isocyanate, β-isocyanato-ethyl ester of (meth)acrylic acid, p-allyloxy-phenylisocynate, styrene isocyanate, but preferably p-isopropenyl - phenyl isocyanate.

Any of the masking agents known in isocyanate chemistry may be used for masking these isocyanates, for example caprolactam, phthalimide, imidazole, ethyl acetate, malonic acid esters and acetoxime but preferably phenols such as phenol, o-, m-, and p-cresols and p-tertiary butyl phenol.

These masked isocyanates are copolymerised with the vinyl monomers in quantities of from 0.1 to 10% by weight and preferably 1 to 7% by weight. The copolymers with masked isocyanate groups which are suitable for the process according to the invention can be prepared in known manner, e.g. according to a copending application (U.S. patent application Ser. No. 676,618).

N-carbaryloxy-aminocarboxylic acids which are suitable for the polyamide grafting are, for example, the following:

N-carbophenoxy-β-aminopropionic acid,
N-carbophenoxy-6-aminocaproic acid,
N-carbophenxy-11-aminoundecanoic acid,
N-carbo-(4-chlorophenyl)-oxy-6-aminocaproic acid,
N-carbo-(4-tertiary-butylphenyl)-oxy-6-aminocaproic acid,
N-carbophenoxy-3-aminobenzoic acid,
N-carbophenoxy-4-aminobenzoic acid,
N-carbophenoxy-3-amino-4-methylbenzoic acid,
N-carbophenoxy-3-amino-4-chlorobenzoic acid,
N-carbophenoxy-4-amino-3-methoxybenzoic acid,
N-carbo-(4-chlorophenyl)-oxy-3-aminobenzoic acid,
N-carbo-(4-tertiary-butylphenyl)-oxy-3-aminobenzoic acid,
N-carbophenoxy-3-aminophenylacetic acid,
N-carbophenoxy-β-(3-aminophenyl)-isobutyric acid and
N-carbophenoxy-3-aminocinnamic acid.

These N-carbaryloxy-aminocarboxylic acids may also be used as admixtures.

It is preferred to use N-carbophenoxy-6-aminocaproic acid, N-carbophenoxy-11-amino-undecanoic acid, N-carbophenoxy-3-aminobenzoic acid and N-carbophenoxy-4-aminobenzoic acid.

The process may be carried out by relating to reaction temperature the mixture of the vinyl copolymer and the N-carbaryloxy-aminocarboxylic acid or the mixture of different N-carbaryloxy-aminocarboxylic acids, if desired together with chain regulating agents, and continuously removing the hydroxylaryl being evolved, if desired under reduced pressure, The reaction temperatures are generally between about 150 and about 300° C., preferably between 180 and 270° C. The reaction times vary with the reaction temperature and are generally between 10 and 180 minutes. The pressure can be reduced to 50 to 0.1 mm. Hg to complete the reaction.

Aliphatic carboxylic acids such as formic acid, acetic acid and stearic acid may be used as chain regulating agents. They are advantageously used in quantities such that 1 mol of chain regulating agent is used per mol of the masked isocyanate which is incorporated by polymerisation.

Another method of carrying out the process according to the invention is by polycondensation in solution. In this method, the mixture of vinyl copolymer with N-carbaryloxy-aminocarboxylic acid or with the mixture of different N-carbaryloxy-aminocarboxylic acids, if desired with chain regulating agents, is reacted at temperatures of 150 to 300° C., if desired under pressure, in 5 to 100 times the amount of an organic solvent, which solvent may contain additions of inorganic salts. The reaction time is so calculated that the solutions are obtained at the desired viscosity so that they can be immediately worked up, or the polymer isolated from them by the addition of non-solvents, such as water.

Examples of solvents which are suitable for this method of procedure are: N,N-dimethylformamide, N,N-dimethylacetamide, N-methylcaprolactam, N-methylpyrrolidone and tetramethylene urea as well as phenols and cresols.

The salts which may be added are, for example, lithium chloride, magnesium chloride, calcium chloride and zinc chloride.

In both methods of carrying out the process according to the invention, the proportion by weight of vinyl copolymer to N-carbaryloxy-aminocarboxylic acid may be varied within wide limits according to the desired properties of the graft copolymer. It is preferred to use mixtures in which the proportion by weight of vinyl copolymer to grafted polyamide in the graft copolymer is between 10:1 and 1:50.

The vinyl copolymers grafted with polyamide can be used as thermoplasts and as additives to thermoplasts. They may be worked up directly from the melt, e.g. by injection moulding to produce moulded articles, or from their solutions, e.g. to produce foils or coatings. The products may also be worked up by melt spinning or solution spinning processes to form filaments which have good mechanical properties.

The following examples are to further illustrate the invention without limiting it.

Examples 1 to 4 describe the preparation of the vinyl copolymers which are used for the polyamide grafting.

EXAMPLE 1

5 g. of phenyl p-isopropenylphenyl carbamate and 95 g. of styrene are dissolved in 100 g. of xylene. After the addition of 1 g. of azobisisobutyronitrile, polymerisation is carried out under nitrogen at 80° C. 98% conversion is reached after a reaction time of 27 hours, and a clear yellow solution which has a solids content of 50% is obtained. This solution is slowly introduced dropwise into 500 ml. of boiling petroleum ether and the precipitated copolymer is filtered off, washed with petroleum ether and dried under vacuum at 60° C. 85 g. (85%) of a colourless powder are obtained.

EXAMPLE 2

A solution of 5 g. of the phenyl ester of p-isopropenyl phenyl carbamic acid in 80.75 g. of styrene and 14.25 g. of acrylonitrile is added to a solution of 1 g. of sodium lauryl sulphate as emulsifier and 0.2 g. of potassium persulphate as catalyst in 150 ml. of water. After the addition of 0.07 g. of sodium pyrosulphite, the emulsion is heated to 60° C. with vigorous stirring under a nitrogen atmosphere. When the strongly exothermic polymerisation reaction has started, the reaction mixture is cooled. The total reaction time amounts to 2 hours at 60° C. and 15 minutes at 90° C.

The polymer is isolated from the emulsion by precipitation with 2% $CaCl_2$ solution, washed free from salt with distilled water and dried under vacuum at 50° C. 95 g. (95%) of a colourless powder are obtained.

EXAMPLE 3

58 ml. of 1 N sodium hydroxide solution is rapidly added dropwise to a solution of 265 mg. of polyvinyl alcohol and 7.32 g. of $MgSO_4.7H_2O$ in 300 ml. of water with stirring.

A solution of 1 g. of azobisisobutyronitrile and 2.5 g. of phenyl p-isopropenylphenylcarbamate in 97.5 g. of methyl methacrylate is suspended in this dispersing medium and is polymerised by heating at 80° C. for 5 hours under nitrogen with uniform stirring. After cooling, the colourless pearly polymer is filtered off, stirred with 1 N sulphuric acid for about 1 hour, washed until neutral with distilled water and dried under vacuum at 60° C. 97 g. (97%) of a colourless pearly polymer are obtained.

EXAMPLE 4

80 g. of styrene, 15 g. of ethyl acrylate and 5 g. of phenyl p-isopropenylphenyl carbamate are polymerised in 100 g. of xylene as described under Example 1 and isolated.

Examples 5-22 describe the preparation of the vinyl-copolymers with a polyamide graft.

The relative solution viscosity of the grafted copolymers was in all cases measured on a 1% solution in m-cresol at 25° C.

EXAMPLE 5

A mixture of 29.7 g. of 11-carbophenoxy-aminoundecanoic acid and 0.3 g. of the vinyl copolymer described in Example 1 are melted at 180° C. under nitrogen and heated at 270° C. for 60 minutes. At the same time, the pressure is reduced at intervals of 10 minutes from 260 to 100, 10 and <1 mm. Hg. Carbon dioxide and phenol are liberated and a clear, viscous melt which can be spun into filaments is obtained.

The relative viscosity of the graft copolymer was 3.52.

EXAMPLES 6-16

The mixtures of carbophenoxyaminocarboxylic acid, vinyl copolymer and chain regulating agent shown in Table 1 were reacted together as in Example 5.

The table indicates the reaction conditions and the resulting viscosities of the graft copolymers. The graft copolymers can be spun into filaments.

EXAMPLE 17

This example describes grafting in solution. A mixture of 28.5 g. of 6-carbophenoxy-aminocaproic acid, 1.5 g. of the vinyl copolymer described in Example 3 and 0.17 g. of stearic acid are dissolved in 10 g. of phenol at 180° C. Carbon dioxide is liberated by increasing the temperature to 270° C. within 45 minutes; the phenol which was used as solvent distils off together with the phenol which is liberated. A clear melt remains behind. The desired viscosity is obtained by reducing the pressure to ≤1 mm. Hg within 10 minutes. The product has a relative viscosity of 2.68.

EXAMPLE 18

By the same method as in Example 17, a mixture of 24.0 g. of 6-carbophenoxy-aminocaproic acid, 6.0 g. of the polymer described under Example 3 and 0.68 g. of stearic acid were reacted in 25 g. of phenol. After a reaction time of 85 minutes, a viscous product which has a relative viscosity of 3.42 is obtained.

EXAMPLE 19

A mixture of 30 g. of 11-carbophenoxy-amino-undecanoic acid and 10 g. of the vinyl polymer prepared according to Example 4 in 500 ml. of dimethylacetamide together with 5% by weight of lithium chloride as solubilising agent was heated under reflux for 40 hours. The polymer was precipitated from the viscous solution by the addition of 200 ml. of methanol and then washed free from salt with water. The relative viscosity was 1.38.

EXAMPLE 20

This example describes the grafting of the vinyl copolymers according to Example 4 with mixtures of different carbophenoxyaminocarboxylic acids.

A mixture of 5 g. of vinyl copolymers according to Example 4, 10 g. of 11-carbophenoxy-amino-undecanoic acid and 10 g. of 6-carbophenoxy-aminocaproic acid was melted under nitrogen at 180° C. and then heated at 240° C. for 30 minutes, during which time carbon dioxide and phenol were liberated, and the reaction mixture was then condensed for 20 minutes at this temperature under a pressure of 20 mm. Hg and then for 3 minutes at a pressure of <1 mm. Hg. The product has a viscosity of 2.10.

EXAMPLE 21

By the same method as in Example 20 but using 15.0 g. of 11-carbophenoxy-amino-undecanoic acid and 5 g. of carbophenoxy-3-aminobenzoic acid, a graft copolymer which had a viscosity of 2.47 was obtained.

EXAMPLE 22

Under analogous conditions to those employed under Example 19 but using a mixture of 15 g. of 6-carbophenoxy-aminocaproic acid and 5 g. of carbophenoxy-3-aminobenzoic acid, a product which had a relative viscosity of 1.85 was obtained.

TABLE 1

| Example | Carbophenoxy-aminocarboxylic acid | Vinyl copolymer according to example | Stearic acid, g. | Reaction time (min.) | Relative viscosity |
|---|---|---|---|---|---|
| 6 | 28.5 g. 6-carbophenoxy-amino-caproic acid. | 1.5 grams, 1 | | 25 | 2.84 |
| 7 | 22.5 g. 11-carbophenoxy-amino-undecanoic acid. | 2.5 grams, 1 | | 50 | 3.15 |
| 8 | 24 g. 6-carbophenoxy-amino-caproic acid. | 6.0 grams, 1 | 0.675 | 45 | 1.59 |
| 9 | 24 g. 11-carbophenoxy-amino-undecanoic acid. | do | 0.34 | 50 | 2.90 |
| 10 | 28.5 g. 11-carbophenoxy-amino-undecanoic acid. | 1.5 grams, 2 | | 85 | 3.10 |
| 11 | 28.5 g. 11-carbophenoxy-amino-undecanoic acid. | do | 0.17 | 85 | 2.66 |
| 12 | 28.5 g. 11-carbophenoxy-amino-undecanoic acid. | 1.5 grams, 4 | | 30 | 3.20 |
| 13 | 27.0 g. 6-carbophenoxy-amino-caproic acid. | 3.0 grams, 4 | 0.17 | 60 | 2.47 |
| 14 | 24.0 g. 6-carbophenoxy-amino-caproic acid. | 6.0 grams, 4 | 0.675 | 45 | 1.57 |
| 15 | 18.0 g. 11-carbophenoxy-amino-undecanoic acid. | 12.0 grams, 4 | 0.675 | 85 | 1.46 |
| 16 | 24.0 g. 11-carbophenoxy-amino-undecanoic acid. | 6.0 grams, 4 | 0.085 | 65 | 2.87 |

What we claim is:

1. A vinylcopolymer with a polyamide graft side chain having the recurring structural unit

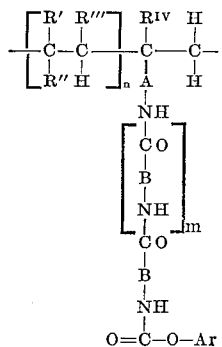

wherein R' represents hydrogen, chlorine, methyl, phenyl, methyl-substituted phenyl, acetoxy, nitrile, the radical ROOC (in which R is $C_1$ to $C_4$ alkyl) or the radical $$\begin{matrix} R^V \\ \diagdown \\ \phantom{R}N-CO- \\ \diagup \\ R^{VI} \end{matrix}$$

(in which $R^V$ and $R^{VI}$ are hydrogen, methyl or ethyl),
R'' represents hydrogen, chlorine or methyl,
R''' represents hydrogen or methyl,
$R^{IV}$ represents hydrogen or methyl,
A represents a single bond,

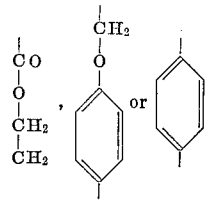

B represents a $C_3$ to $C_{10}$ alkylene radical, a phenylene radical, a chloro-, methyl- or methoxy-substituted phenylene radical or a phenyl alkyl radical, or combinations thereof within one side chain, Ar represents a phenyl or substituted phenyl radical, and n and m are whole numbers, the ratio by weight of the units

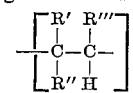

to the units

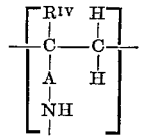

in the graft backbone being about 999:1 to about 9:1, and the ratio by weight of the graft backbone to the polyamides grafted thereon being about 10:1 to 1:50.

2. The vinylcopolymer with a polyamide graft side chain of claim 1, having the recurring structural unit

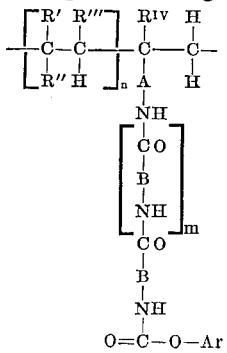

wherein
R' represents phenyl, methyl-substituted phenyl, nitrile or the radical ROOC (in which R is $C_1$ to $C_4$ alkyl),
R'' represents hydrogen or methyl,
R''' represents hydrogen,
$R^{IV}$ represents methyl,
A represents p-phenylene,
B represents a $C_3$ to $C_{10}$ alkylene radical or combinations thereof within one side chain,
Ar represents phenyl, and,
n and m are whole numbers, the ratio by weight of the units

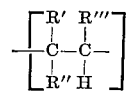

to the units

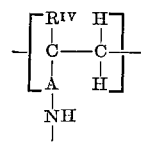

in the graft backbone being about 999:1 to about 9:1, and the ratio by weight of the graft backbone to the polyamides grafted thereon being about 10:1 to 1:50, the molecular weight of the units

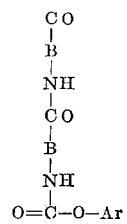

being in the range of from 1000 to 50,000.

3. The vinylcopolymer with a polyamide graft side chain of claim 1, having the recurring structural unit

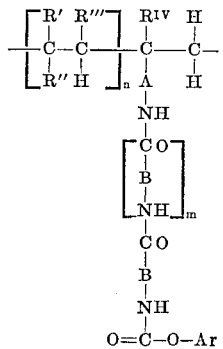

wherein
R' represents phenyl, nitrile or the radical ROOC (in which R is methyl or ethyl)
R'' represents hydrogen or methyl,
R''' represents hydrogen,
$R^{IV}$ represents methyl,
A represents p-phenylene,
B represents a $C_3$ to $C_{10}$ alkylene radical or combinations thereof within one side chain,
Ar represents phenyl, and
n and m are whole numbers, the ratio by weight of the units

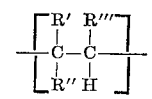

to the units

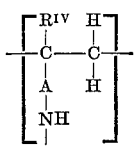

in the graft backbone being about 40:1 to 19:1, and the ratio by weight of the graft backbone to the polyamides grafted thereon being about 1:1 to about 1:50.

4. A process for the production of a vinylcopolymer with a polyamide graft side chain having the recurring structural unit

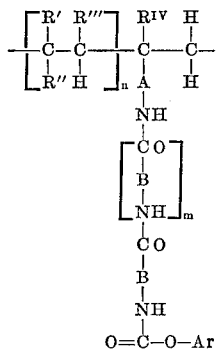

wherein R′ represents hydrogen, chlorine, methyl, phenyl, methyl-substituted phenyl, acetoxy, nitrile, the radical ROOC (in which R is $C_1$ to $C_4$ alkyl) or the radical

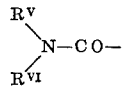

(in which $R^V$ and $R^{VI}$ are hydrogen, methyl or ethyl),
R″ represents hydrogen, chlorine or methyl,
R‴ represents hydrogen or methyl,
$R^{IV}$ represents hydrogen or methyl,
A represents a single bond,

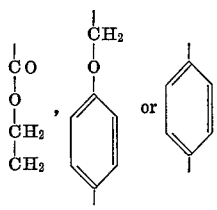

B represents a $C_3$ to $C_{10}$ alkylene radical, a phenylene radical, a chloro-, methyl- or methoxy-substituted phenylene radical or a phenyl alkyl radical, or combinations thereof within one side chain, Ar represents a phenyl or substituted phenyl radical, and $n$ and $m$ are whole numbers the ratio by weight of the units

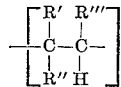

to the units

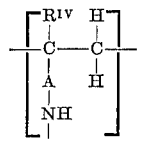

in the graft backbone being about 999:1 to about 9:1, and the ratio by weight of the graft backbone to the polyamides grated thereon being about 10:1 to 1:50; said process comprising polycondensing N-carbaryloxyaminocarboxylic acids or mixtures thereof in the presence of vinylcopolymers of vinyl monomers which contain masked isocyanate groups, said polycondensing being carried out at temperatures of between about 150 and about 300° C.

5. The process of claim 4, said polycondensing being carried out under reduced pressure.

6. The process of claim 4, said polycondensing being carried out in the presence of organic solvents and under excess pressure.

7. The process of claim 4, said polycondensing being carried out in the presence of chain regulating agents.

8. The process of claim 4, the vinyl copolymers which contain masked isocyanate groups and the N-carbaryloxy-aminocarboxylic acids being used in a proportion by weight of 10 to 0.02.

9. The process of claim 4, the vinyl copolymers which contain masked isocyanate groups containing 0.1 to 10% by weight of the vinyl component which contains the masked isocyanate group.

References Cited
UNITED STATES PATENTS

| | | | |
|---|---|---|---|
| 3,325,561 | 6/1967 | Grillo | 260—857 |
| 3,388,186 | 6/1968 | Kray et al. | 260—857 |
| 3,465,059 | 9/1969 | Seven | 260—857 |

PAUL LIEBERMAN, Primary Examiner

U.S. Cl. X.R.

260—77.5, 78, 80.73, 82.1, 85.5, 85.7, 86.1, 87.5, 88